No. 779,312. PATENTED JAN. 3, 1905.
A. B. PRATT.
FRUIT PICKER.
APPLICATION FILED JUNE 2, 1904.
2 SHEETS—SHEET 1.
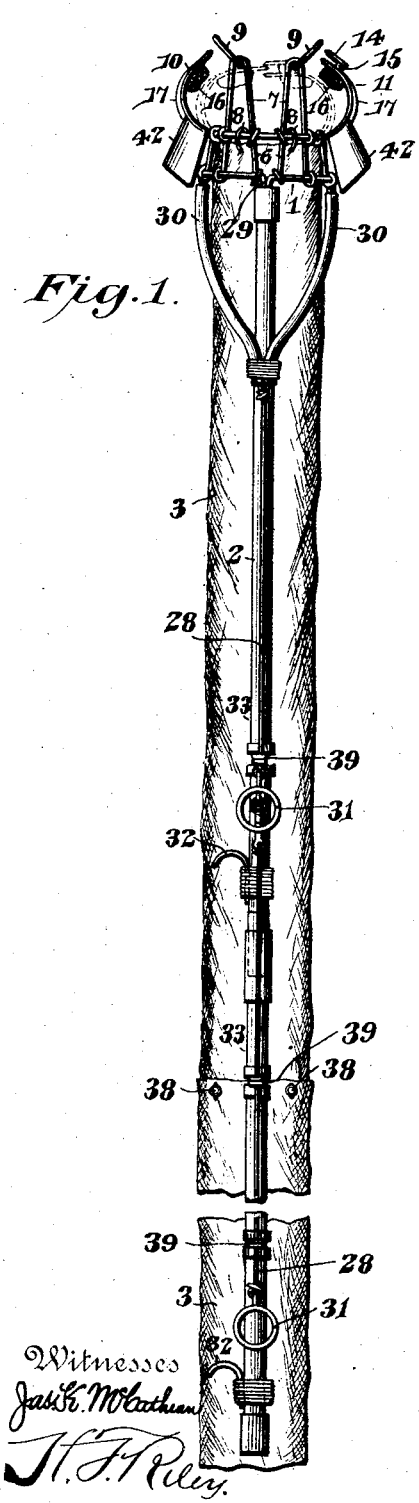
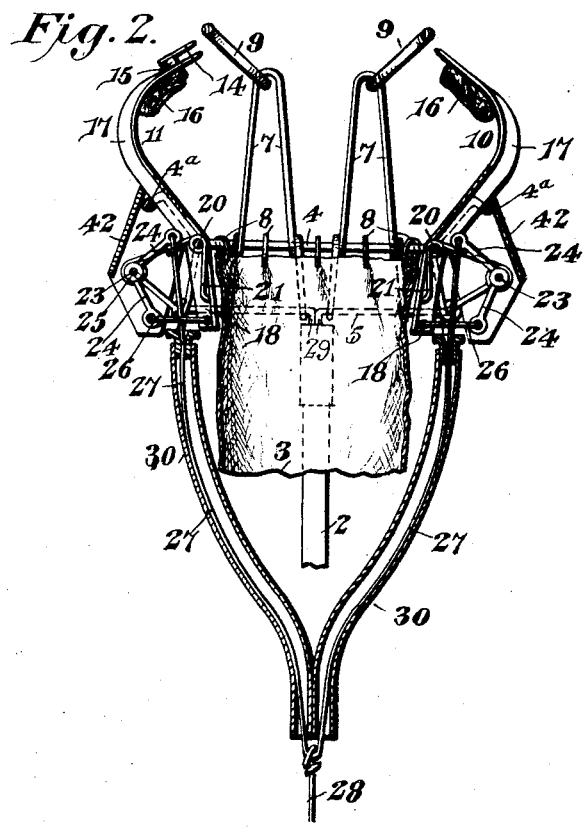
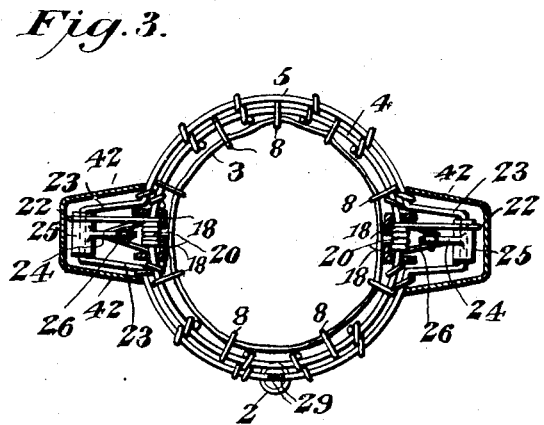
Albert B. Pratt, Inventor

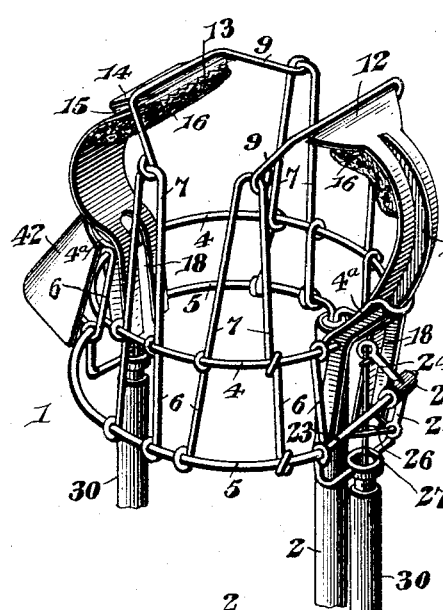

No. 779,312. Patented January 3, 1905.

UNITED STATES PATENT OFFICE.

ALBERT B. PRATT, OF DORCHESTER, MASSACHUSETTS.

FRUIT-PICKER.

SPECIFICATION forming part of Letters Patent No. 779,312, dated January 3, 1905.

Application filed June 2, 1904. Serial No. 210,843.

*To all whom it may concern:*

Be it known that I, ALBERT B. PRATT, a citizen of the United States, residing at Dorchester, in the county of Suffolk and State of Massachusetts, have invented a new and useful Fruit-Picker, of which the following is a specification.

The invention relates to improvements in fruit-pickers.

The object of the present invention is to improve the construction of fruit-pickers and to provide a simple and comparatively inexpensive one designed for picking various kinds of fruit and capable of quickly gathering and transfering the same to a basket or other receptacle without injuring the fruit.

Another object of the invention is to prevent the cutters from coming in contact with the fruit while placing the device around the same and also while severing the fruit from the tree.

A further object of the invention is to provide a device of this character of great strength and durability adapted to be varied in length to arrange it to suit the height of a tree from which the fruit is to be picked.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is an elevation of a fruit-picker constructed in accordance with this invention. Fig. 2 is an enlarged longitudinal sectional view of the upper or outer end of the fruit-picker. Fig. 3 is a horizontal sectional view of the same. Fig. 4 is an enlarged perspective view of the upper or outer end of the fruit-gatherer. Fig. 5 is an elevation of the same. Fig. 6 is an enlarged longitudinal sectional view of one side of the upper or outer end of the fruit-gatherer, illustrating the manner of mounting and actuating the cutters. Fig. 7 is an enlarged detail sectional view illustrating the manner of connecting the sections of the rod and the operating-wire. Fig. 8 is an enlarged detail sectional view of the outer ends of the cutters, the latter being closed.

Like numerals of reference designate corresponding parts in all the figures of the drawings.

1 designates a substantially cylindrical chute-carrying frame mounted on the upper end of a rod or pole 2 and receiving the mouth or upper end of a flexible chute 3. The body portion of the chute-carrying frame is composed of upper and lower approximately circular wires 4 and 5 and upright connecting-wires 6, which are extended at opposite sides of the frame to form projecting loops or fingers 7. The upper end or mouth of the chute is provided at intervals with eyes 8, which are strung on the upper circular wire 4, whereby the chute is secured to the frame 1. The projecting loops or fingers 7, which are arranged in pairs at opposite sides of the frame 1, support arched guards 9, which are located above and in advance of the cutting edges of a pair of cutters 10 and 11 when the latter are open, as illustrated in Fig. 2 of the drawings. The chute-supporting frame is preferably constructed of stout wire, and the guards are also constructed of similar material and are suitably secured to the outer ends of the projecting loops or fingers 7. The wires are preferably secured together by means of eyes and by soldering them; but any other suitable means may be employed for connecting the wires together, as will be readily understood.

The cutters 10 and 11 are provided with openings, which are fulcrumed between their ends on the upper or outer circular wire of the frame 1 at diametrically opposite points on the same, and the upper or outer portions of the shanks are curved and present inner concaved faces and outer convexed faces. The upper ends of the cutters are enlarged, and the cutter 10 is sharpened to provide an upper cutting edge 12. The other cutter is provided with a serrated or toothed edge 13, and it has a blade 14 mounted on it and spaced from the serrated edge. The blade 14 is arranged on the exterior of the cutter 11 and is suitably secured to the same by rivets or other fastening devices, spacing blocks or pieces 15 being interposed between the blade and the cutter. The cutting edges of the cutters lie below and slightly in rear of the guards 9, so that there is no liability of the fruit coming in contact with the cutters when the device is placed in position for severing the fruit from the tree. The cutters are swung together, as hereinafter described, for severing the fruit from the tree, and in order to prevent them from coming in contact with and bruising or otherwise injuring the fruit they are provided at their inner faces with pads of rubber sponge 16; but any other desired form of cushion may be employed for this purpose. For instance, a pneumatic cushion or a fabric or other pad may be advantageously employed for this purpose. The cutters are braced or reinforced by means of longitudinal ribs 17, arranged on the outer faces of the cutters and having forked lower portions 18, which straddle slots or openings 19 of the lower portions or arms of the shanks of the cutters. The lower portions of the exterior reinforcing-ribs 17 are provided with alined perforations to receive the upper or outer circular wire 4, which forms the pintles for the cutters. The cutters are normally held in their open position by means of springs 20, consisting of a pair of arms, and a connecting spring-coil, which is disposed on the upper or outer circular wire of the frame 1. One arm, 21, of the spring 20 is secured to the lower portion of the shank of the cutter, and the other arm, 22, is connected with the frame 1. The outward or open movement of the cutters is limited by inclined stop-loops 4ª, extending from the outer circular wire 4 and having depressions or bends at their outer portions to receive the reinforcing-flanges of the cutters.

The lower circular member or wire 5 of the frame 1 is extended at diametrically opposite points to form inclined loops 23, which are located adjacent to the inner portions of the shanks of the cutters and constitute supports and fulcrums for bell-crank levers 24, which are provided at their angles with sleeves 25 to receive the loops of the lower or inner member 5 of the frame. These bell-crank levers have upper and lower arms, which are inclined upwardly and downwardly from the projecting loops 23 when the cutters are open. The lower arms of the bell-crank levers are connected by V-shaped wires 26 with the lower portions of the shanks of the cutters, at opposite sides of the slots or openings thereof; but any other suitable connecting means may be employed, as will be readily understood. The upper or upwardly-extending arms are connected with branches 27 of an operating-wire 28; but a cord or other suitable flexible connection may be employed. When the upper arms of the bell-crank levers are swung downward, the lower arms swing outward and carry with them the lower portions of the shanks of the cutters. The bell-crank levers are located opposite the slots or openings of the cutters, and the upper arms extend through the same when they are operated. The terminals 29 of the circular wire or member 5 of the frame are preferably extended and embedded in the upper end of the pole, and the frame 1 is supported at opposite sides by inclined outwardly-diverging tubular braces 30, which also receive and form guides for the branches 27 of the operating-wire 28. The tubular braces are suitably secured at their outer ends to the lower or inner circular wire or member 5 of the frame 1 and are connected at their inner ends and secured to the back of the pole. When the operating-wire is pulled, motion is communicated through the bell-crank levers to the cutters, which are swung inward toward each other, whereby they are caused to sever the stem of the fruit. When the cutters are at the limit of their inward movement, the cutting edges overlap, as clearly illustrated in Fig. 8 of the drawings, whereby the fruit is positively severed from the tree.

In order to enable the operating-wire to be readily manipulated, it is provided with a thumb-receiving ring 31, and the pole is provided with a curved guard 32, beneath which the fingers are placed in gripping the pole. By this construction the pole may be readily gripped and the operating-wire effectively operated with the right hand. This will leave the left hand free for taking hold of the chute to retard the fall of the fruit. A basket or other receptacle may be conveniently carried on the left arm, and the chute will direct the fruit into the same, and by retarding the fruit in its passage through the chute there will be no liability of bruising or otherwise injuring the fruit.

The pole may be constructed of light wood, tubular metal, or any other suitable material, and it is preferably composed of sections 33 to enable it to be be varied in length to suit the height of a tree from which the fruit is to picked. The sections are provided with suitable joints, preferably consisting of tubular portions or ferrules 34, arranged to receive reduced portions 35. The operating wire or connection is also constructed of sections, which are connected by means of eyes 36 and snap-hooks 37 or other suitable means. Each section of the rod or pole is provided with a curved guard 32, and each of the sections of the operating-wire is provided with a thumb-receiving ring or member 31. The chute is also constructed of sections secured together by buttons and buttonholes, as indicated at 38; but any other suitable fastening means may be employed. The pole is provided with rigid guides or eyes 30 for the operating-wire, and it has hinged eyes 40, adapted to receive hooks 41 of the chute, whereby the latter is attached to the pole.

In order to prevent the branches from interfering with the operation of the bell-crank levers and the cutters, the frame 1 is provided at opposite sides with shields 42, constructed of sheet metal or other suitable material. These shields, which may be suitably secured to the frame 1 in any desired manner, are substantially U-shaped in cross-section, as clearly illustrated in Fig. 3 of the drawings.

Having thus fully described my invention, what I claim as new, and desire to secure by Letters Patent, is—

1. A fruit-picker, comprising a pole, a frame carried by the pole, cutters pivotally mounted on the frame at opposite sides thereof, levers connected with the cutters, and operating means having branches connected with the said levers.

2. A fruit-picker, comprising a pole, a frame carried by the pole, cutters pivotally mounted at opposite sides of the frame, bell-crank levers fulcrumed at their angles on the frame and connected at one arm with the cutters, and operating means carried by the pole and having branches connected with the other arm of the bell-crank levers.

3. A fruit-picker, comprising a frame, cutters pivotally mounted on the frame at opposite sides thereof, springs for holding the cutters normally open, levers also mounted on the frame and connected with the cutters, and operating means connected with the levers for actuating the cutters.

4. A fruit-picker, comprising a frame provided with projecting loops, cutters pivotally mounted on the frame at opposite sides thereof and located adjacent to the loops, levers fulcrumed on the loops and connected with the cutters, and operating means connected with the levers for operating the cutters.

5. A fruit-picker, comprising a frame having upper and lower substantially circular members provided with projecting loops, cutters fulcrumed on the upper member and having their outward movement limited by the loops of the said upper member, levers fulcrumed on the loops of the lower member and connected with the cutters, and operating means connected with the levers for actuating the cutters.

6. A fruit-picker, comprising a frame, cutters pivotally mounted on the frame between their ends and having openings at their lower portions, springs engaging the cutters for holding the same normally open, levers connected with the cutters and located opposite the openings thereof, and operating means connected with the levers for actuating the cutters.

7. A fruit-picker, comprising a frame, cutters pivotally mounted thereon, levers connected with the cutters, operating means connected with the levers for actuating the cutters, and shields mounted on the frame and covering the levers.

8. A fruit-picker, comprising pivotally-mounted cutters, one of the cutters having a toothed edge and provided with a blade spaced from it to receive the engaging portion of the other cutter, and means for operating the cutters.

9. A fruit-picker provided with cutters, and having guards located in advance of the cutters and mounted independently thereof and arranged to prevent fruit from coming in contact with the cutters.

10. A fruit-picker, comprising a frame, cutters mounted on the frame, and arched guards also mounted on the frame and located in advance of the cutters when the latter are open.

11. A fruit-picker, comprising a frame provided with projecting fingers, cutters located at opposite sides of the frame, and arched guards mounted on the fingers and arranged to prevent the cutters from coming in contact with the fruit.

12. A fruit-picker, comprising a frame, cutters mounted on the frame, arched guards also mounted on the frame and located in advance of the cutters to prevent the fruit from coming in contact with the same when the said cutters are open, and cushions for preventing the cutters in closing from coming in contact with the fruit.

13. A fruit-picker, comprising a frame having upper and lower circular wires and provided with projecting fingers, a pole connected with the frame, a chute arranged within the frame and connected with the upper circular wire, and cutting mechanism.

14. A fruit-picker, comprising a frame, a pole, cutters mounted on the frame, tubular braces extending from the pole to the frame, and operating means having branches extending through the tubular braces and connected with the cutters.

15. A fruit-picker, comprising a frame, a pole connected with the frame, outwardly-diverging tubular braces extending from the pole to the frame, cutters, and operating means composed of a flexible connection having branches extending through the tubular braces and connected with the cutters.

In testimony that I claim the foregoing as my own I have hereto affixed my signature in the presence of two witnesses.

ALBERT B. PRATT.

Witnesses:
H. F. RILEY,
JOHN H. SIGGERS.